March 3, 1936.  G. R. LARKIN  2,032,370
LIQUID LEVEL GAUGE
Filed Jan. 15, 1935
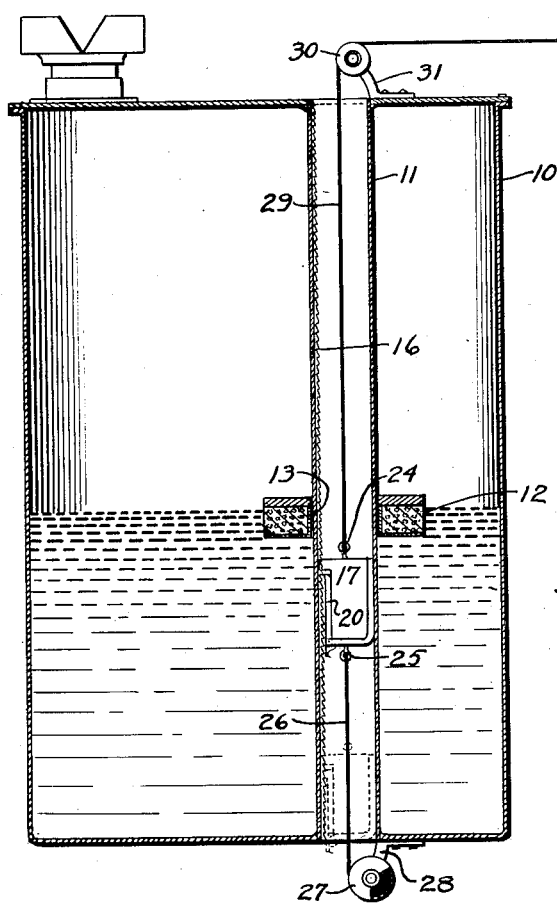
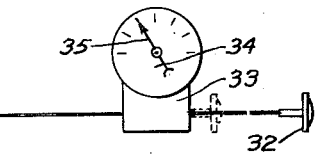
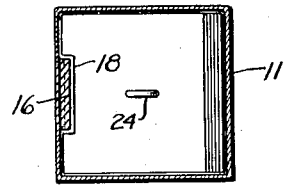
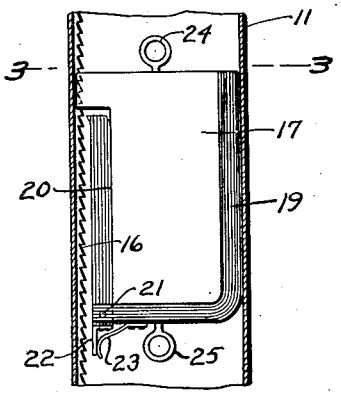
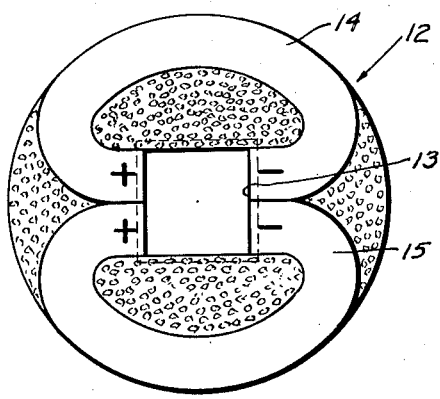
INVENTOR
GEORGE R. LARKIN
ATTORNEYS Patented Mar. 3, 1936

2,032,370

UNITED STATES PATENT OFFICE 2,032,370

LIQUID LEVEL GAUGE

George R. Larkin, Dayton, Ohio

Application January 15, 1935, Serial No. 1,904

8 Claims. (Cl. 73—82)

(Granted under the act of March 3, 1883, as amended April 30, 1928; 370 O. G. 757)

The invention described herein may be manufactured and used by or for the Government for governmental purposes, without the payment to me of any royalty thereon.

The present invention relates generally to means for measuring and indicating the quantity of liquid in a tank, and particularly to instruments adapted for use in connection with motor vehicles for measuring and indicating the quantity of fuel in the fuel storage tank carried by the vehicle.

The primary object of the present invention is to provide a liquid level gauge including a manually operable indicating mechanism and a float associated with said indicating mechanism and operating to positively control the operation of said mechanism in obtaining indication of fluid contents in a tank.

A further object of the present invention is to provide in a gauge of this character, a float including magnetic means the attractive force of which is utilized to control the range of movement of the operating mechanism.

A further object of the present invention is to provide in a gauge of this character, a float incorporating magnetic means, and an operating mechanism associated therewith but physically separated therefrom, the float being freed to rise and fall with the liquid level in the tank but operating to positively control the range of movement of the indicating mechanism.

A still further object of the present invention is to provide a liquid level gauge in which a combined magnetic flotation element and an indicating mechanism is utilized for the remote indication of the level of a liquid in a tank or other containers.

The ends particularly aimed at in the provision of my improved gauge are lightness, so as to permit of its use in connection with the fuel and oil tanks of aircraft, automobiles and the like; cheapness and compactness, so as to permit of its being readily installed in various sizes and shapes of tanks without the necessity of modifying the tank construction; and serviceability, so as to permit of its continuous operation under adverse conditions or severe mishandling.

Further objects will be more fully set forth in the following specification, in the claims and in the drawing, in which:

Fig. 1 is a longitudinal sectional view of the gauge showing the device mounted in the fuel tank and illustrating in a diagrammatic manner the hook-up arrangement thereof with a remote indicating instrument;

Fig. 2 is an enlarged top plan view of the magnetic flotation element per se;

Fig. 3 is a sectional view taken on the line 3—3 of Fig. 4; and

Fig. 4 is an enlarged detail sectional view of a portion of the indicating mechanism disposed within the tank.

Referring more particularly to the drawing wherein corresponding parts are designated by like numerals throughout the several views, the numeral 10 represents a fuel tank for an automotive vehicle. As shown more particularly in Fig. 1, the tank 10 is provided with a guide member 11 which embodies a square or rectangular non-magnetic tube extending vertically through the tank. The ends of the guide member are sealed to the tank but are open to the atmosphere providing a passageway through the tank to receive an operating mechanism hereinafter more particularly described. The tubular guide member 11 is surrounded by a float 12 which may be of any suitable material and may be provided with a tubular central member 13 adapted to slide along the guide member 11. A pair of magnets 14 and 15 are mounted upon and carried by the float 12, the float rising and falling with the rise and fall of the liquid level in the tank and thereby positioning the magnet or magnets relative to and along the length of the guide member 11.

A ratchet rack 16 is secured to the inner wall of the tubular guide member 11 and extends throughout the entire length of the passageway hereinabove referred to.

An operating mechanism in the form of a traveler is slideably mounted within the guide member 11. This traveler embodies essentially a body portion 17 of non-magnetic material which is provided at its upper end with a groove 18 which forms a guideway so that the body portion 17 is freely slideable longitudinally within the guide member 11, and yet prevented from moving angularly with respect to the said guide member. The numeral 19 represents a strap of material capable of being readily magnetized which extends downward along the one side and laterally across the bottom of the body portion 17 of the traveler. A pawl 20 of soft iron or other readily magnetizable material is pivotally mounted at its lower end to the lower outer end 21 of the strap 19. An extension 22 formed on the lower end of the pawl 20 is engaged by the free end of a flat spring 23 carried by the strap 19 so that the pawl will be normally retained in the position illustrated in Fig. 4, with the pawl end thereof out of engagement with the teeth of the ratchet rack 16.

Suitable eyelets 24 and 25 are provided at the top and the bottom of the traveler 17. The bottom eyelet 25 has attached thereto a flexible cable or cord 26, the free end of which is suitably connected to a spring controlled reel 27 generally illustrated in Fig. 1. This reel is mounted for rotational movement on a bracket member 28 which is fixedly secured to the bottom of the tank 10.

The upper eyelet 24 has attached thereto a flexible cable 29 which passes over a pulley 30 pivotally mounted upon an upper bracket member 31 which is fixedly secured to the top of the tank 10. The outer end of the cable 29 has attached thereto a knob or handle 32. In this manner the traveler 17 may be drawn upwardly within the guide member 11. To indicate the length of cable pulled upwardly, an indicator 33 is provided which includes a pointer 34, a scale 35 and an operating mechanism (not shown), the pointer 34 of which is caused to move angularly over the scale 35 proportionally to the linear travel of the handle 32 and thus indicate in suitable units of liquid volume the liquid contents in the tank 10.

Operation of the device is as follows: Normally the traveler 17 will be in the bottom of the guide member 11 in the dotted line position illustrated in Fig. 1. With a certain amount of liquid in the tank 10, as shown in Fig. 1, the float 12 will ride on the surface of the liquid. The magnets 14 and 15 will cause a magnetic field to cross the tubular guide member 11 at a predetermined distance above or below the level of the liquid, depending on the positioning of the magnet on the float. When the handle 32 is moved to the right, as viewed in Fig. 1, the traveler 17 will rise until it comes within the influence of the field of the magnet. At this time the upper free end of the pawl 20 will be attracted outwardly and the pawl end will move into positive locking engagement with the teeth of the ratchet rack 16 and prevent further upward movement of the traveler.

The distance the handle 32 has been moved linearly will then be a measurement of the depth of the liquid in the tank and an indication of that distance will be registered by the pointer of the indicator 33 in its movement over the scale 35. After reading the volume of the liquid in the tank, the handle 32 is released and the traveler 17 is returned to the bottom of the tank either under the influence of gravity or under the influence of the spring contained within the reel 27 heretofore mentioned.

I am aware that various changes and modifications in my invention may be made, and I do not desire to be limited to the exact construction shown, and described herein for purposes of illustration. I desire to have it understood that such changes may be made when desired as are within the scope of the following claims appended hereto.

Having thus described my invention, what I claim as new and desire to secure by Letters Patent is:

1. In a fuel tank, an upstanding tubular guide member extending through said tank but not communicating therewith, a movable member slidable longitudinally within said guide member, a normally inoperative pawl and ratchet device associated with said slidable member, and said guide member, magnetic flotation means outside of and guided vertically by said guide member adapted to move said pawl and ratchet device into positive relative operative engagement when the pawl piece comes within the influence of the field of said magnetic means and thereby limit the upward range of movement of said slidable member and means for indicating the movement of said movable member.

2. In a fuel tank, an upstanding tubular guide member extending through said tank but not communicating therewith, a ratchet rack mounted and enclosed in said guide member, a movable member slidable longitudinally within said guide member including a pawl piece, magnetic means slidably mounted on said guide member to rise and fall with the liquid level in the tank and operative to move the pawl piece into engagement with the teeth of said ratchet rack through the attractive force of said magnetic means and arrest upward movement of said slidable member and means for indicating the movement of said movable member.

3. In a fuel tank, an upstanding tubular guide member extending through said tank but not communicating therewith, a ratchet rack mounted and enclosed in said guide member, a movable member slidable longitudinally within said guide member including a pawl piece, magnetic means slidably mounted on said guide member to rise and fall with the liquid level in the tank and operative to move the pawl piece into engagement with the teeth of said ratchet rack through the attractive force of said magnetic means and arrest upward movement of said slidable member, and means for indicating the movement of said movable member including manual means for operating said slidable member from the exterior of the tank whereby the position of said slidable member when arrested by the attractive force of said magnetic means shall serve to indicate the amount of liquid in the tank.

4. In a fuel tank, an upstanding tubular guide member of non-magnetic material extending through said tank but not communicating therewith, a ratchet rack mounted and inclosed in said guide member, a movable member of non-magnetic material slidable longitudinally within said guide member, a pawl piece of readily magnetizable material pivotally mounted on said movable member, magnetic flotation means surrounding said tubular guide member and guided thereby vertically and operative to move the pawl end of said pawl piece into positive locking engagement with the teeth of said ratchet rack thru the attractive force of said magnetic means and arrest upward movement of said slidable member beyond said magnetic means and means for indicating the movement of said movable member.

5. In a fuel tank, an upstanding tubular guide member of non-magnetic material extending through said tank but not communicating therewith, a ratchet rack mounted and enclosed in said guide member, a manually operable member movable longitudinally within said guide member, a normally inoperative spring loaded pawl piece of readily magnetizable material pivotally mounted on said manually operated member, magnetic flotation means slidable up and down on said guide with changes of liquid level independently of the longitudinal movement of said manually operable member and operative to move the pawl piece into positive locking engagement with the teeth of said ratchet rack by its magnetic attraction and arrest upward movement of said manually operable member and means for indicating movement of said manually operable member.

6. In a fuel tank, an upstanding tubular guide member of non-magnetic material extending through said tank but not communicating therewith, a ratchet rack mounted and enclosed in said guide member, a manually operable member slidable longitudinally within said guide member, a normally inoperative spring loaded pawl piece of readily magnetizable material pivotally mounted at its lower end on said manually operated member, magnetic flotation means slidable up and down on said guide member with changes of liquid level independently of the longitudinal movement of said manually operable member and operative to move the pawl piece into positive locking engagement with the teeth of said ratchet rack by its magnetic attraction and arrest upward movement of said manually operable member and means for indicating the movement of said slidable member including manual means for operating said slidable member from the exterior of the tank whereby the position of said slidable member when arrested by the attractive force of said magnetic means shall serve to indicate the amount of liquid in the tank.

7. In a fuel tank, an upstanding tubular guide member of non-magnetic material extending through said tank but not communicating therewith, a ratchet rack mounted and enclosed in said guide member, a manually operable member slidable longitudinally within said guide member, a normally inoperative spring loaded pawl of readily magnetizable material pivotally mounted on said manually operated member, magnetic flotation means slidable up and down on said guide member with changes of liquid level independently of the longitudinal movement of said manually operable member and operative to move the pawl piece into positive locking engagement with the teeth of said ratchet rack by its magnetic attraction and arrest upward movement of said manually operable member, means for indicating the movement of said slidable member including means for manually operating said slidable member from the exterior of the tank whereby the position of said slidable member when arrested by the attractive force of said magnetic means shall serve to indicate the amount of liquid in the tank, and spring means for positively returning said slidable member to its normal position in the lower end of said guide upon releasing of said last mentioned means.

8. In a fuel tank, an upstanding tubular guide member of non-magnetic material extending through said tank but not communicating therewith, a ratchet rack mounted and enclosed in said guide member, a manually operable member movable longitudinally within said guide member, a normally inoperative spring loaded pawl piece of readily magnetizable material pivotally mounted on said manually operated member, magnetic flotation means slidable up and down on said guide member with changes of liquid level independently of the longitudinal movement of said manually operable member and operative to move the pawl in positive locking engagement with the teeth of said ratchet rack by its magnetic attraction and arrest upward movement of said manually operable member, means for manually operating said slidable member from the exterior of the tank whereby its position when arrested by said magnetic means will serve to indicate the amount of liquid in the tank, and an indicating mechanism operated by movement of said slide operating means to visually indicate the linear movement of said manually operated means.

GEORGE R. LARKIN.